(12) United States Patent
Parra Carqué

(10) Patent No.: US 7,970,500 B2
(45) Date of Patent: Jun. 28, 2011

(54) SENSOR FUSION SYSTEM AND METHOD FOR ESTIMATING POSITION, SPEED AND ORIENTATION OF A VEHICLE, IN PARTICULAR AN AIRCRAFT

(75) Inventor: Sergio De La Parra Carqué, Torrejón De Ardoz (ES)

(73) Assignee: Instituto Nacional De Tecnica Aeroespacial "Esteban Terradas", Torrejón De Ardoz (ES)

( * ) Notice: Subject to any disclaimer, the term of this patent is extended or adjusted under 35 U.S.C. 154(b) by 1089 days.

(21) Appl. No.: 10/590,578

(22) PCT Filed: Feb. 25, 2005

(86) PCT No.: PCT/ES2005/000088
§ 371 (c)(1),
(2), (4) Date: May 4, 2007

(87) PCT Pub. No.: WO2005/083358
PCT Pub. Date: Sep. 9, 2005

(65) Prior Publication Data
US 2007/0213889 A1    Sep. 13, 2007

(30) Foreign Application Priority Data
Feb. 27, 2004   (ES) .................................. 200400474

(51) Int. Cl.
*G01C 21/26* (2006.01)
*G06F 19/00* (2006.01)

(52) U.S. Cl. ............ 701/7; 701/23; 701/220; 342/357.2

(58) Field of Classification Search .................... 701/77, 701/3, 4, 7, 214, 220; 342/357.02, 357.2
See application file for complete search history.

(56) References Cited

U.S. PATENT DOCUMENTS

| | | | |
|---|---|---|---|
| 5,321,631 A | 6/1994 | Germanetti | 364/559 |
| 5,774,832 A | 6/1998 | Vanderwerf | 701/220 |
| 6,496,779 B1 | 12/2002 | Hwang | 701/220 |
| 2002/0116125 A1 | 8/2002 | Lin | 701/214 |

OTHER PUBLICATIONS

International Search Report dated Jun. 10, 2005 from PCT/ES2005/000088.

*Primary Examiner* — Tan Q Nguyen
(74) *Attorney, Agent, or Firm* — Ohlandt, Greeley, Ruggiero & Perle, LLP

(57) ABSTRACT

This invention relates to a system for estimating the position, velocity and orientation of a vehicle, by determining the components of two noncollinear constant unit vectors $\hat{g}_b, \hat{e}_b$ according to vehicle body axes; and determining the components of the noncollinear constant unit vectors $\vec{g}_t, \vec{e}_t$ according to Earth's axes. The system further determines the three components of angular velocity $\hat{\omega}_b$ of the vehicle in body axes; corrects the angular velocity $\hat{\omega}_b$ with a correction $u_\omega$ and obtains a corrected angular velocity $\hat{\omega}_b = \hat{\omega}_b + u_\omega$; a control module implementing a control law to calculate the correction $u_\omega$, where the control law is:

$$u_\omega = \sigma(\hat{g}_b \times \hat{g}_b + \hat{e}_b \times \hat{e}_b) \quad [1]$$

where σ is a positive scalar,
such that upon using the corrected angular velocity $\hat{\omega}_b = \hat{\omega}_b + u_\omega$ as input to a module for integrating the kinematic equations, the latter are stable in the ISS sense and the error in the estimation of the direction cosine matrix $\hat{B}$ and of the Euler angles $\hat{\phi}$ is bounded.

8 Claims, 6 Drawing Sheets

SENSOR FUSION SYSTEM AND METHOD FOR ESTIMATING POSITION, SPEED AND ORIENTATION OF A VEHICLE, IN PARTICULAR AN AIRCRAFT

BACKGROUND OF THE DISCLOSURE

1. Field of the Disclosure

This invention relates to a method and system for integrating data from different sensors and estimating the position, velocity and orientation of a vehicle. It is particularly suited to being applied to Unmanned Aerial Vehicles (UAV) incorporating low-cost sensors for:

determining the attitude and orientation of the vehicle;
determining its position and velocity;
navigating during limited time periods without GPS.

The invention is comprised within the fields of sensor fusion, attitude determination and inertial navigation.

2. Description of Related Art

There are several methods for estimating the position, velocity and orientation of a vehicle:

1. Inertial Navigation System or INS: Integrates the angular accelerations and velocities provided by an Inertial Measurement Unit (IMU) to calculate the position, velocity and orientation of the vehicle. Since this integration is neutrally stable, errors accumulate and the obtained solutions quickly diverge unless very high quality sensors are used, increasing system cost and weight.

The solution is to stabilize the integration by means of closed loop feedback with measurements from other sensors that do not diverge over time. Airspeed measurements and the measurements provided by GPS and magnetometers are used for this purpose. Several methods are used to integrate all or part of these measurements:

1.1. Linear Kalman Filter: It is the simplest filter with the lowest computational cost and therefore very interesting for low-cost applications. The drawback is that it is applicable only to linear or linearized dynamical systems. Therefore it can only be used in certain cases.

1.2. Complementary Kalman Filter: INS algorithms are used to integrate the measurements of an IMU that may be a low-cost IMU. The INS inputs are corrected with the outputs of a linear Kalman filter consisting of an INS and measurement error model and fed by the error between the position and velocity estimated by the INS and the measurements by the remaining sensors. The drawback is that linearization leading to the error model means that the global convergence is not assured and spurious updates could lead to system divergence; furthermore, like all Kalman filters its design implies knowledge of statistics of both the measurement noise and process noise and that these noises are white, Gaussian and non-correlated noises, which in the case of low-cost sensors occurs rather infrequently. Its computational cost ranges between moderate to high, depending on the size of the state vectors and measurements.

1.3. Extended Kalman Filter: This is probably the most widely used filter as it is more precise than the standard Kalman filter. It can estimate the vehicle dynamics which is generally not linear because it allows non-linear terms both in the model and in the measurements. It has a higher risk of divergence than the standard Kalman because the covariance equations are based on the linearized system and not on the real non-linear system. Its asymptotic local stability has been proven, but its global stability cannot be assured. In addition to sharing with the remaining Kalman filters the need to know the noise and measurement statistics, its computational cost is high.

2. Static or Single Frame Method: Unlike the previous filtering methods, a static estimation is carried out consisting of obtaining the orientation from a set of unit vector measurements in both body axes and reference axes. Almost all logarithms (Davenport's, QUEST, FOAM, . . .) are based on resolving the Wahba problem which consists of finding an orthogonal matrix with a +1 determinant minimizing a cost function made up of the weighted sum of error squares between the unit vectors in body axes and the result of transforming the vectors into reference axes by the matrix that is sought. It is usually applied in space systems in which the unit vectors are obtained by pointing at the sun and other stars.

There are some examples of the application to a dynamic estimation but it is based on its integration in a linear or complementary Kalman filter with the previously discussed drawbacks.

SUMMARY OF THE INVENTION

The invention relates to a system according to claim 1 and to a method according to claim 7. Preferred embodiments of the system and method are defined in the dependent claims.

Given the shortcomings of the prior art, which can be summarized as:

no assurance of global convergence;
need to know noise and process statistics;
need for the measurement and process noises to be white, Gaussian and non-correlated;
moderate to high computational cost;

the object of this invention consists of providing a sensor fusion system according to claim 1 and a method according to claim 7 which:

is globally convergent in the ISS (Input-to-State Stability) sense;
does not require complex statistical models; and
has a low computational cost.

To attain the aforementioned objectives it is necessary to solve the problem of stabilizing the integration of kinematic equations in a global manner without being computationally costly. To do so, rather than using statistical estimation methods such as in the Kalman filter this invention approaches the problem as a non-linear control problem and solves it by making use of the Lyapunov stability theory, finding a control law that provides the corrections $u_\omega$ which have to be applied to the angular velocity to stabilize the integration of the kinematic equations in an asymptotic global manner.

The approach of the non-linear control problem and its solution has been developed as follows:

a. Approach: $\vec{g}_b, \vec{e}_b$ are two constant unit vectors expressed in vehicle-fixed axes (body axes) and $\vec{g}_t, \vec{e}_t$ are the same vectors expressed in local axes (Earth's axes).

If B is the direction cosine matrix, then:

$$\vec{g}_b = B\vec{g}_t$$

$$\vec{e}_b = B\vec{e}_t$$

By integrating kinematic equations with the measured angular velocity, $\hat{\omega}_b$, a direction cosine matrix $\hat{B}$ would be obtained, which would be known to be erroneous due to sensor imprecision. Therefore, a correction $u_\omega$ will be applied to the measured angular velocity. Referring to $\hat{\omega}_b = \bar{\omega}_b + u_\omega$ as the corrected angular velocity and by integrating it, the direction cosine matrix $\hat{B}$ will be obtained. Estimated vectors $\hat{g}_b, \hat{e}_b$ can be obtained from this direction cosine matrix:

$$\vec{\hat{g}}_b = \hat{B}\vec{g}_t$$

$$\vec{\hat{g}}_b = \hat{B}\vec{e}_t$$

Now it is necessary to determine the correction $u_\omega$ to cancel out the error $$\tilde{g}_b = \vec{g}_b - \hat{g}_b, \tilde{e}_b = \vec{e}_b - \hat{e}_b \quad [1.1]$$

This is a non-linear control problem that is going to be solved using an extension of the Lyapunov function concept referred to as Lyapunov Control Function (Clf) [ref. 1] in the following steps:

1. Forming the system $$\dot{z} = f(z, u_\omega), z = \begin{bmatrix} \tilde{g}_b \\ \tilde{e}_b \end{bmatrix}, f(0,0) = 0 \quad [1.2]$$

2. Finding a Clf for the previous system, i.e. a continuous derivable, positive-definite and non-radially bounded function J: $\square^6 \to \square_+$ such that:

$$\inf_{u_\omega \in \square} \left\{ \frac{\partial J}{\partial z}(z) f(z, u_\omega) \right\} < 0, \forall z \neq 0 \quad [1.3]$$

3. Finding a control law $u_\omega = \alpha(z)$ such that if $W(z)$ is a positive-definite function, the following is satisfied:

$$\frac{\partial V}{\partial z}(z) f(z, \alpha(z)) \leq -W(z) \quad [1.4]$$

4. The LaSalle-Yoshizawa Theorem [ref. 1] assures that system [1.2] with $u_\omega = a(z)$ is globally uniformly asymptotically stable (GUAS) for the equilibrium point $z=0$.

b. Solution:

1. The following system is obtained by deriving [1.1]:

$$\dot{\tilde{g}}_b = -\hat{\omega}_b \times \tilde{g}_b + u_\omega \times \hat{g}_b$$
$$\dot{\tilde{e}}_b = -\hat{\omega}_b \times \tilde{e}_b + u_\omega \times \hat{e}_b \quad [1.5]$$

2. The following Clf will be tried:

$$J(z) = \frac{1}{2}[\tilde{g}_b \cdot \tilde{g}_b + \tilde{e}_b \cdot \tilde{e}_b] \quad [1.6]$$

the derivative of which according to the solution of [1.5] is:

$$\frac{\partial J}{\partial z}(z) f(z, u_\omega) = \quad [1.7]$$
$$-\tilde{g}_b \cdot (\hat{\omega}_b \times \tilde{g}_b) + \tilde{g}_b \cdot (u_\omega \times \hat{g}_b) - \tilde{e}_b \cdot (\hat{\omega}_b \times \tilde{e}_b) + \tilde{e}_b \cdot (u_\omega \times \hat{e}_b)$$

Taking into account the vector product properties:

$$\frac{\partial J}{\partial z}(z) f(z, u_b) = -u_\omega \cdot (\vec{g}_b \times \hat{g}_b + \vec{e}_b \times \hat{e}_b) \quad [1.8]$$

3. The following control law is used:

$$u_\omega = \sigma(\hat{g}_b \times \hat{g}_b + \hat{e}_b \times \hat{e}_b) \quad [1]$$

where a is a positive scalar.

Calling $\vec{\Gamma} = \vec{g}_b \times \hat{g}_b + \vec{e}_b \times \hat{e}_b$ and substituting in [1.8], the following is obtained:

$$\frac{\partial V}{\partial z}(z) f(z, u_\omega) = -\sigma(\vec{\Gamma} \cdot \vec{\Gamma}) = -\sigma|\vec{\Gamma}|^2 \quad [1.10]$$

4. Given that $\Gamma^2$ is a positive-definite function, [1.4] is true and system [1.5] with $u_\omega = \alpha(z)$ is globally uniformly asymptotically stable (GUAS) for equilibrium point $z=0$ according to the LaSalle-Yoshizawa theorem [ref. 1].

c. Robustness: The previous Control Law meets the proposed objectives but only if perfect measurements of the $\vec{g}_b, \vec{e}_b$ vectors are available, which in practice would make it useless. However, as will be shown below this is not the case and this control law is still valid with erroneous measurements provided that they are bounded, as occurs in common practice.

Suppose that measurements $\hat{g}_b, \hat{e}_b$ contain additive errors. The real vector will be the one measured plus the measurement errors:

$$\vec{g} = \hat{g} + \tilde{g}, \vec{e} = \hat{e} + \tilde{e} \quad [1.11]$$

By substituting in the definition of $\vec{\Gamma}$, the following is considered:

$$\vec{\Gamma} = (\hat{g}_b + \tilde{g}_b) \times \hat{g}_b + (\hat{e}_b + \tilde{e}_b) \times \hat{e}_b \quad [1.12]$$
$$= [(\hat{g}_b \times \hat{g}_b) + (\hat{e}_b \times \hat{e}_b)] + [(\tilde{g}_b \times \hat{g}_b) + (\tilde{e}_b \times \hat{e}_b)]$$
$$= \hat{\Gamma} + \tilde{\Gamma}$$

As only the measured value of $\vec{\Gamma}$ will be known, only $\hat{\Gamma}$ can be used in the control laws and equation [1.10] is modified to be:

$$\frac{\partial J}{\partial z}(z) f(z, u_\omega) = -\sigma((\vec{\Gamma} - \tilde{\Gamma}) \cdot \vec{\Gamma}) \quad [1.13]$$
$$= -\sigma|\vec{\Gamma}|^2 + \sigma(\tilde{\Gamma} \cdot \vec{\Gamma})$$

so it can no longer be assured that system [1.5] with $u_\omega = \sigma\vec{\Gamma}$ is globally uniformly asymptotically stable (GUAS) for the equilibrium point $z=0$. However, it will be demonstrated that it is ISS (Input-to-State Stable) [ref. 2], [ref. 3] and [ref. 1], i.e. the following property is satisfied:

$$|z(t)| \leq \beta(|z(0)|, t) + \gamma\left(\sup_{0 \leq \tau \leq t} |\tilde{\Gamma}(\tau)|\right) \quad [1.14]$$

where $\beta$ is a class KL function and $\gamma$ is a class K function [ref. 1].

By using Young's inequality, the following is considered:

$$\Gamma \cdot \tilde{\Gamma} \leq \tilde{\Gamma} \cdot \tilde{\Gamma} + \frac{1}{4}(\Gamma \cdot \Gamma) \quad [1.15]$$

and substituting in [1.13]:

$$\frac{\partial J}{\partial z}(z)f(z, u_\omega) \leq -0.75\sigma|\Gamma|^2 + \sigma|\tilde{\Gamma}|^2 \quad [1.16]$$

proving that $$\frac{\partial V}{\partial z}(z)f(z, u_\omega) < 0, \forall z \neq 0,$$

provided that $$|\Gamma|^2 > \frac{4}{3}\|\tilde{\Gamma}\|_\infty^2.$$

As $J(z)$ and $\Gamma^2(z)$ are positive-definite and are not radially bounded and $J(z)$ is smooth, there are class $K_\infty$ $\gamma_1, \gamma_2, \gamma_3$ functions such as:

$$\gamma_1(|z|) \leq J(z) \leq \gamma_2(|z|) \; \gamma_3(|z|) \leq \Gamma^2(z) \quad [1.17]$$

Therefore, $$|z(t)| > \gamma_3^{-1}\left(\frac{4}{3}\|\tilde{\Gamma}\|_\infty^2\right) \Rightarrow \dot{J} < 0 \quad [1.18]$$

Which means that if:
then:

$$|z(0)| \leq \gamma_3^{-1}\left(\frac{4}{3}\|\tilde{\Gamma}\|_\infty^2\right)$$

then:

$$J(z(t)) \leq \gamma_2 \circ \gamma_3^{-1}\left(\frac{4}{3}\|\tilde{\Gamma}\|_\infty^2\right)$$

which in turn means that $$|z(t)| \leq \gamma_1^{-1} \circ \gamma_2 \circ \gamma_3^{-1}\left(\frac{4}{3}\|\tilde{\Gamma}\|_\infty^2\right) \quad [1.19]$$

If on the other hand then $$|z(0)| > \gamma_3^{-1}\left(\frac{4}{3}\|\tilde{\Gamma}\|_\infty^2\right) \quad [1.20]$$

then $$|z(t)| \leq \gamma_1^{-1} \circ \gamma_2(|z(0)|)$$

Therefore, taking into account [1.19] and [1.20], it is shown that z(t) is globally bounded:

$$\|z\|_\infty \leq \max\left\{\gamma_1^{-1} \circ \gamma_2 \circ \gamma_3^{-1}\left(\frac{4}{3}\|\tilde{\Gamma}\|_\infty^2\right), \gamma_1^{-1} \circ \gamma_2(|z(0)|)\right\}$$

and converges to the residual set:

$$\square = \left\{z : |z| \leq \gamma_1^{-1} \circ \gamma_2 \circ \gamma_3^{-1}\left(\frac{4}{3}\|\tilde{\Gamma}\|_\infty^2\right)\right\} \quad [1.21]$$

Furthermore, by Theorem C.2 [ref. 1] (formulated in [ref. 2]), system [1.5] with Control Law $u_\omega = \sigma\vec{\Gamma}$ of is ISS with respect to the errors of the sensors $\tilde{\Gamma}$.

Therefore, this invention relates to a system for estimating the position, velocity and orientation of a vehicle, such as an unmanned aircraft, including:
  means for determining the components of two noncollinear constant unit vectors $\hat{g}_b, \hat{e}_b$ according to vehicle body axes;
  means for determining the components of said noncollinear constant unit vectors $\vec{g}_t, \vec{e}_t$ according to the Earth's axes; and
  means for determining the three components of the angular velocity $\hat{\omega}_b$ of the vehicle in body axes.

The sensor fusion system of the invention further includes:
  means for correcting the angular velocity $\hat{\omega}_b$ with a correction $u_\omega$ and obtaining a corrected angular velocity $\hat{\omega}_b = \hat{\omega}_b + u_\omega$;
  a module for integrating the kinematic equations of the vehicle receiving the corrected angular velocity $\hat{\omega}_b$ as input and providing the transformation matrix $\hat{B}$ for transforming Earth's axes into vehicle body axes and the orientation of the vehicle in the form of Euler angles $\hat{\phi}$;
  a synthesis module of the components in body axes of the two noncollinear constant unit vectors to provide an estimation of said noncollinear vectors in body axes $\hat{g}_b, \hat{e}_b$, where said estimation is calculated as follows:

$$\vec{g}_b \hat{B} \vec{g}_t \; \vec{e}_b = \hat{B} \vec{e}_t$$

a control module implementing a control law to calculate said correction $u_\omega$, where said control law is:

$$u_\omega = \sigma(\hat{g}_b \times \hat{g}_b + \hat{e}_b \times \hat{e}_b) \quad [1]$$

where $\sigma$ is a positive scalar, such that by applying this correction $u_\omega$ to the measured angular velocity $\hat{\omega}_b$ and using the resulting angular velocity $\hat{\omega}_b = \hat{\omega}_b + u_\omega$, as input to the module for integrating the kinematic equations, the latter are stable in the ISS sense and the error in the estimation of the direction cosine matrix $\hat{B}$ and of the Euler angles $\hat{\phi}$ is bounded.

Said noncollinear unit vectors $\vec{g}, \vec{e}$ are preferably local gravity $\vec{g}$ and projection of the magnetic field on the plane perpendicular to gravity $\vec{e}$.

The means for determining the components of the two noncollinear constant unit vectors $\hat{g}_b, \hat{e}_b$ according to vehicle body axes preferably include:
  an inertial measurement unit (IMU) including a group of at least three gyroscopes and at least three accelerometers located along the vehicle body axes;
  a magnetometer with the ability to measure the Earth's magnetic field according to the vehicle body axes;
  static and differential pressure sensors;
  two vanes to measure the angles of attack and sideslip;

an angular velocity acquisition and processing module configured to obtain the angular velocity $\hat{\omega}_b$ (t) measured by the gyroscopes and delaying it to obtain $\hat{\omega}_b(t-\tau)$;

a data acquisition and processing module configured to acquire the specific force $\hat{a}_b$ (t) measured by the accelerometers, the static pressure $\hat{p}_s(t)$, the differential pressure $\hat{p}_d(t)$, the angle of attack $\hat{\alpha}(t)$, the angle of sideslip $\hat{\beta}(t)$, and the value of the Earth's magnetic field $\hat{m}_b(t)$ measured in the magnetometer, delay them and process them to calculate the true airspeed $\hat{v}(t-\tau)$, the air velocity in body axes $\hat{v}_{bb}$ (t-$\tau$) as follows:

$$\hat{v}_b = \begin{bmatrix} \hat{v}\cos\hat{\alpha}\cos\hat{\beta} \\ \hat{v}\sin\hat{\beta} \\ \hat{v}\sin\hat{\alpha}\cos\hat{\beta} \end{bmatrix},$$

to calculate the numerical derivative of the air velocity in body axes $\hat{\dot{v}}_b(t-\tau)$, to calculate the local gravity in body axes $\hat{g}_b$ as follows:

$$\hat{g}_b(t-\tau) = \hat{\dot{v}}_b(t-\tau) + \hat{\omega}_b(t-\tau) \times \hat{v}_b(t-\tau) - \hat{a}_b(t-\tau)$$

and to calculate the projection of the Earth's magnetic field on the horizontal plane perpendicular to local gravity $\vec{e}(t-\tau)$ as follows:

$$\hat{e}_b(t-\tau) = \hat{m}_b(t-\tau) - \hat{m}_b(t-\tau) \cdot \frac{\hat{g}_b(t-\tau)}{|\hat{g}_b(t-\tau)|}.$$

The means for knowing the components of the two noncollinear constant unit vectors $\vec{g}_t, \vec{e}_t$ according to the Earth's axes can include:

a GPS (Global Positioning System) receiver, and the data provided by the GPS are acquired, processed and used in said data acquisition and processing module (17) to calculate the components of the two noncollinear constant unit vectors $\vec{g}_t, \vec{e}_t$ according to the Earth's axes.

The system can preferably include a Savitzky-Golay filter in which $\hat{\dot{v}}_b$, numerical derivative of $\hat{v}_b$, is calculated.

According to an additional aspect of this invention, a sensor fusion system is provided for estimating position and velocity of a vehicle, particularly an unmanned aircraft, preferably further including:

means of acquiring data from a group of sensors located in the vehicle, such as a GPS (Global Positioning System) receiver and a static pressure sensor which provide position and velocity in Earth-fixed axes $\hat{P}_t, \hat{V}_t$;

in the event that the means for knowing the components of the previously mentioned constant unit vectors according to the vehicle body axes did not include data acquisition means of a group of three accelerometers located along the vehicle body axes, the latter will be included to provide the specific force $\hat{a}_b$ in body axes;

a navigation module where the vehicle navigation equations are integrated from the specific force $\hat{a}_b$ and the direction cosine matrix B to obtain calculated position and velocity in local axes and are corrected in a Kalman filter, which can be static, to obtain estimated position and velocity in local axes.

In the case of an unmanned aircraft all these requirements of means for knowing different parameters or for sensor data acquisition can be met with the sensors usually provided in this type of aircrafts, as will be seen in the coming sections, and therefore the amount of sensors needed is not a drawback of this invention, but quite the opposite, it is an advantage insofar as it extracts maximum information from the sensors that it has.

Another object of this invention is to provide a sensor fusion method for estimating the position, velocity and orientation of a vehicle comprising:

calculating the components of two noncollinear constant unit vectors $\hat{g}_b, \hat{e}_b$ according to vehicle body axes from measurements of sensors located in the vehicle according to the body axes of the latter;

calculating the components of said noncollinear constant unit vectors $\vec{g}_t, \vec{e}_t$ according to the Earth's axes from measurements of sensors located in the vehicle which provide position in local axes;

measuring the three components of angular velocity $\hat{\omega}_b$ of the vehicle in body axes;

correcting the angular velocity $\hat{\omega}_b$ with a correction $u_\omega$ and obtaining a corrected angular velocity $\hat{\omega}_b = \hat{\omega}_b + u_\omega$;

integrating the kinematic equations of the vehicle, according to the corrected angular velocity $\hat{\omega}_b$, and providing the transformation matrix B for transforming the Earth's axes into vehicle body axes and the orientation of the vehicle in the form of Euler angles $\hat{\phi}$;

calculating an estimation of the components in body axes of the two noncollinear constant unit vectors $\hat{g}_b, \hat{e}_b$, where said estimation is calculated as follows:

$$\hat{g}_b = \hat{B}\vec{g}_t$$

$$\hat{e}_b = \hat{B}\vec{e}_t$$

obtaining the correction $u_\omega$ by means of the control law:

$$u_\omega = \sigma(\hat{g}_b \times \hat{g}_b + \hat{e}_b \times \hat{e}_b) \qquad [1]$$

where $\sigma$ a positive scalar, such that upon applying this correction $u_\omega$ to the measured angular velocity $\hat{\omega}_b$ and using the resulting angular velocity $\hat{\omega}_b = \hat{\omega}_b + u_\omega$ as input to the module for integrating the kinematic equations, the latter are stable in the ISS sense and the error in the estimation of the direction cosine matrix $\hat{B}$ and of the Euler angles $\hat{\phi}$ is bounded.

Literature:
[ref. 1] Miroslav Krstic, Ioannis Kanellakopoulos, Petar Kokotovic, "Nonlinear and adaptive Control Design", Willey, 1995.
[ref. 2] E. D. Sontag, Smooth stabilization implies co-prime factorization, IEEE Transactions on Automatic Control, AC-34 (1989)
[ref. 3] E. D. Sontag, Yuang Wang, On Characterizations of the Input-to-State Stability Property.
[ref. 4] M. Mandea et al., International Geomagnetic Reference Field - Epoch 2000 Revision Of The IGRF for 2000-2005, http://www.ngdc.noaa.gov/IAGA/wg8/igrf.html, 26 May 2000.
[ref. 5] Brian L. Stevens, Frank L. Lewis, "Aircraft Control and Simulation", Willey 1992
[ref. 6] Hans W. Schüssler, Peter Stefen, "Some Advanced Topics in Filter Design", in Advanced Topics in Signal Processing Prentice Hill 1988.

BRIEF DESCRIPTION OF THE DRAWINGS

A series of drawings which aid in better understanding the invention and which are expressly related to an embodiment of said invention, presented as a non-limiting example thereof, are very briefly described below.

DETAILED DESCRIPTION OF THE DISCLOSURE

As an example of the best way to carry out the invention to practice, the embodiment of a sensor fusion unit is shown for a flight control system of a short-mid range, low speed unmanned aerial vehicle (UAV) without this ruling out the possibility of there being other implementations.

Figure 1:
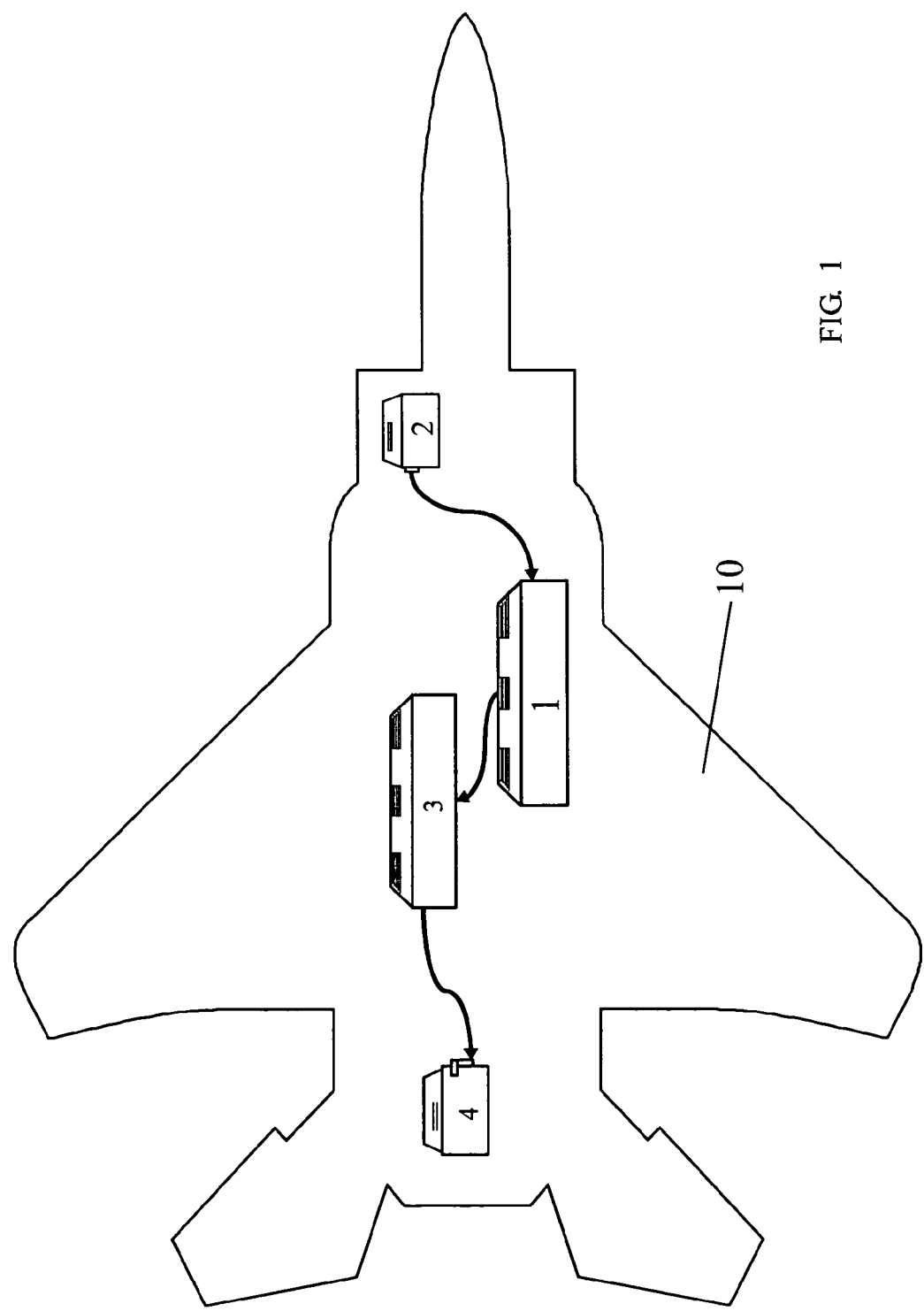
FIG. 1 shows in a block diagram the system of the invention in a navigation, guidance and control system in an unmanned aerial vehicle (UAV).

FIG. 1 shows the flight control system in an unmanned aerial vehicle 10 consisting of sensors 2, the system 1 of the invention, a control and guidance system 3 and actuators 4. The system 1 of the invention supplies information on the attitude, velocity and position to the control and guidance system 3, which in turn provides the corresponding information to the actuators 4 of the aircraft. The information provided by a group of sensors, which in FIG. 1 are depicted together in a single box as sensors 2, are inputs of the system of the invention.

Figure 2:
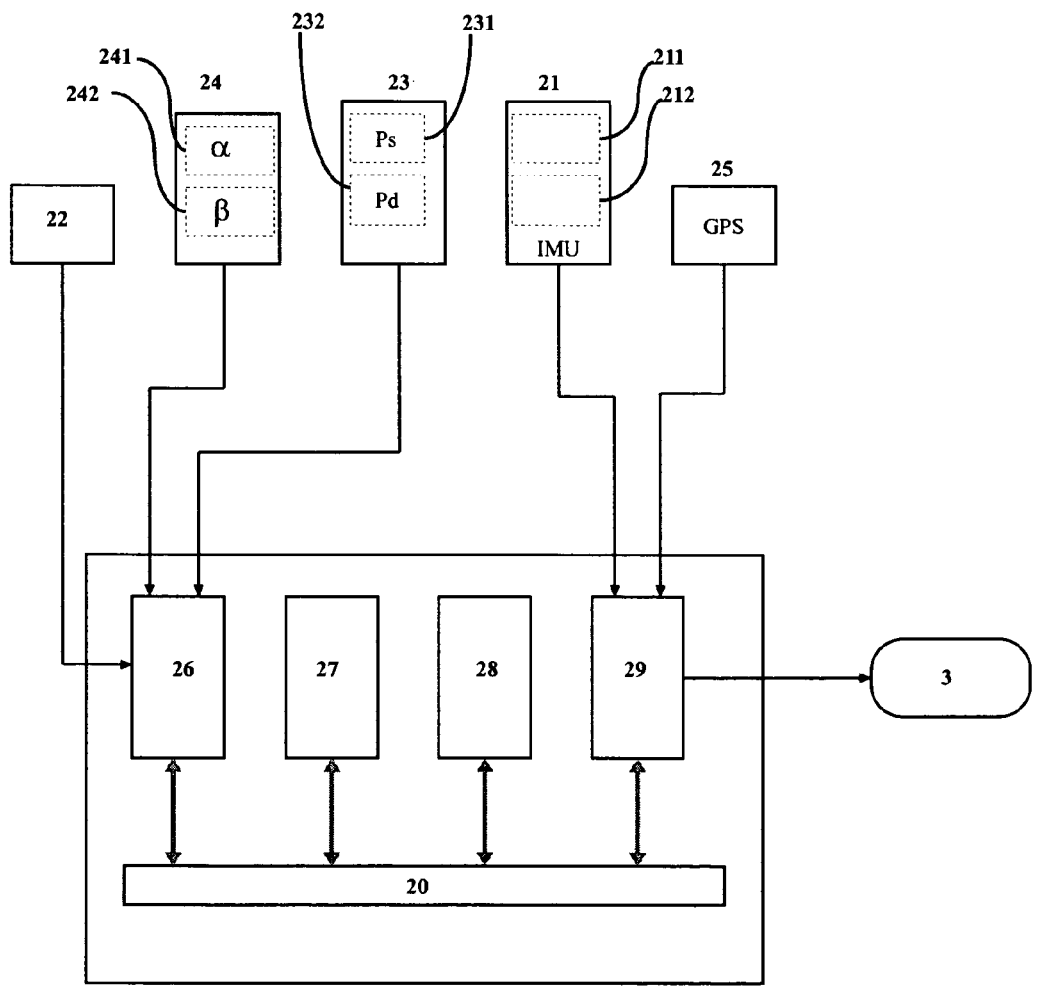
FIG. 2 shows the implementation of the system of the invention as an integrated element of a flight control system.

FIG. 2 details said sensors which are:

an Inertial Measurement Unit (IMU) 21, including a group of three gyroscopes 211 and three accelerometers 212 located along the vehicle body axes (in this case it is a low-cost solid state IMU, for example Crossbow IMU400);

a magnetometer 22 capable of measuring the Earth's magnetic field according to the three vehicle body axes;

a Pitot tube 23 including static pressure 231 and differential pressure 232 sensors;

two vanes 24 provided with potentiometers to measure the angles of attack 241 and sideslip 242;

a GPS (Global Positioning System) receiver 25 with a single antenna.

Figure 3:
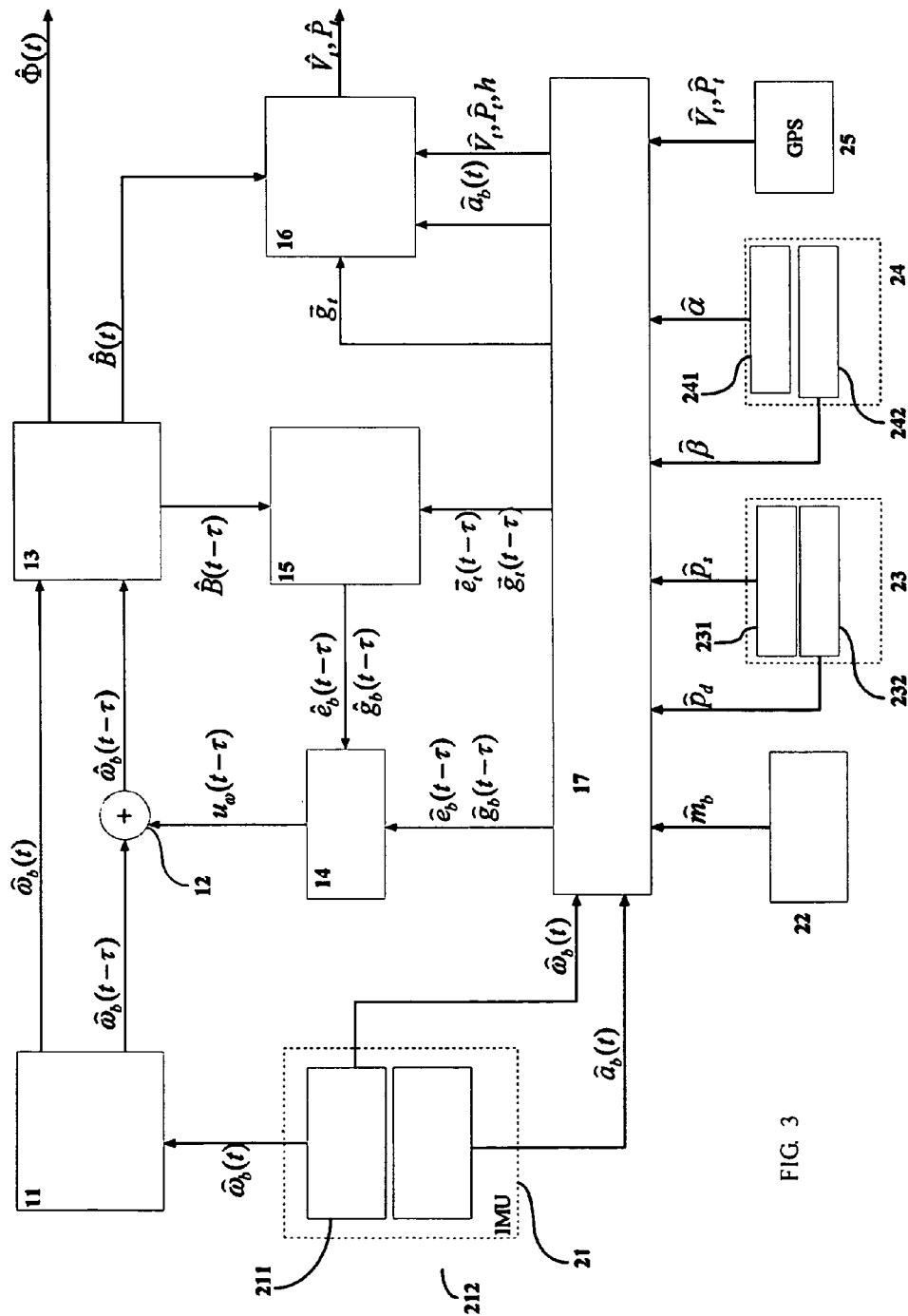
FIG. 3 shows a general block diagram of the elements forming the system of the invention.
Figure 4:
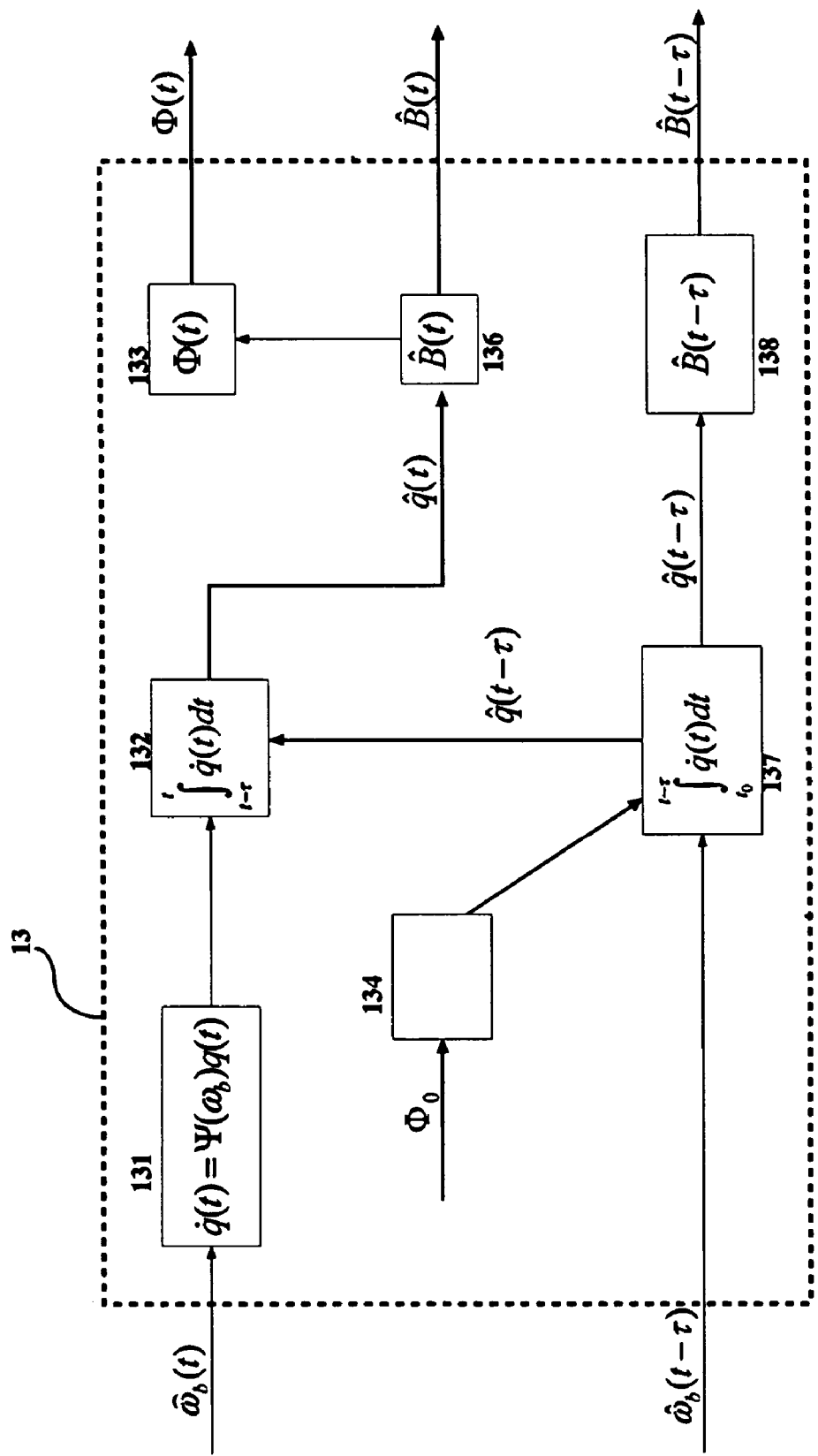
FIG. 4 shows a block diagram of a detailed view of the kinematic equation solution module.
Figure 5:
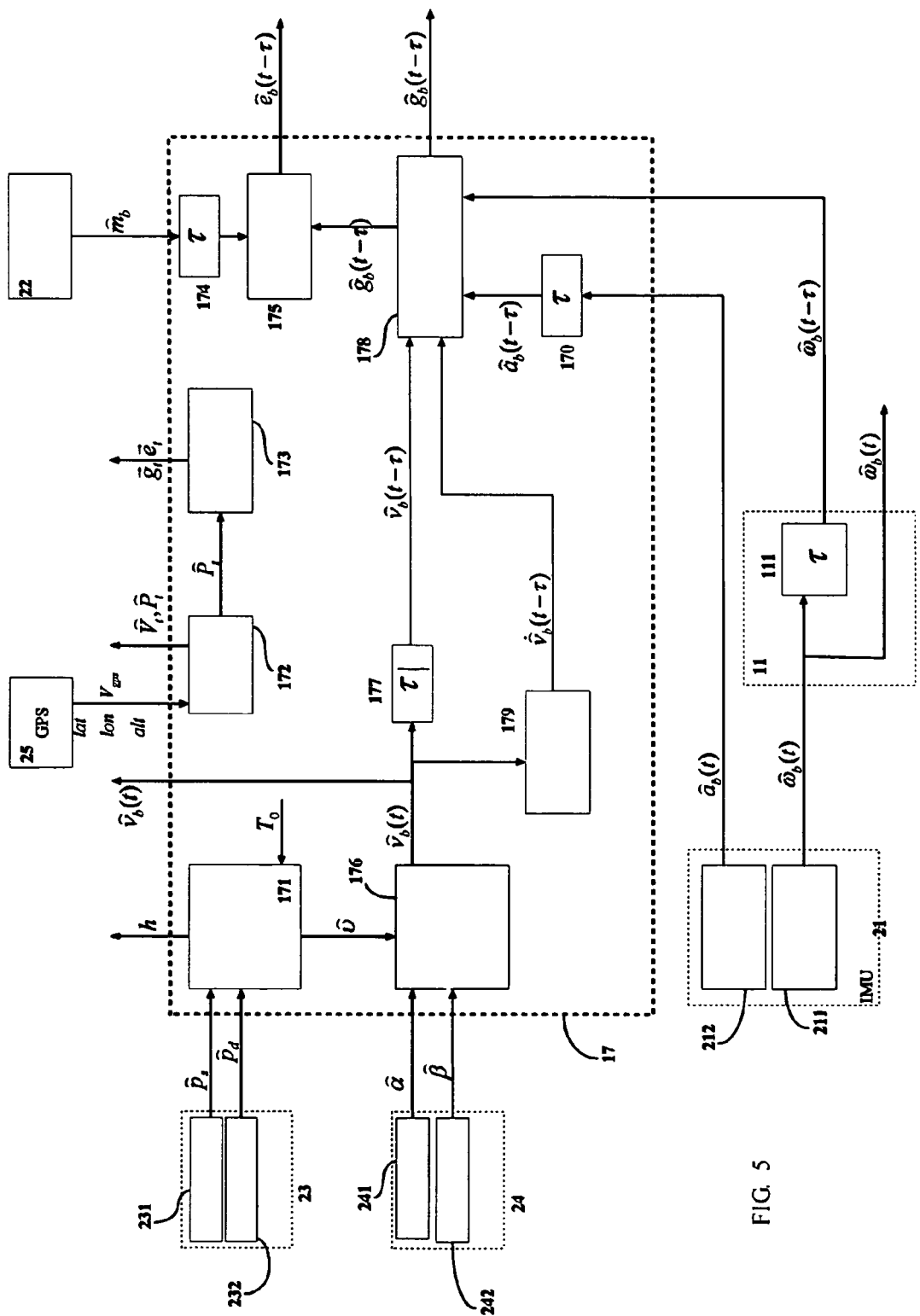
FIG. 5 shows a detailed block diagram of the angular velocity acquisition and processing and the sensor data acquisition and processing modules.

The best contemplated embodiment of the system of the invention is a microprocessor-based system made up of PC-104 cards. As is shown in FIG. 2, the system consists of an analog-digital acquisition card 26 (for example, DM6420 by RTD Embedded Technologies) for acquiring data from the magnetometer 22, the vanes 24 and the Pitot 23, a RS-232 serial port card 29 (for example, CM310 by RTD Embedded Technologies) for acquiring data from the IMU 21 and from the GPS 25, a CPU card 28 (for example, CMV6486 by RTD Embedded Technologies) containing the microprocessor and the memory where the algorithms of modules 11, 12, 13, 14, 15, 16 and 17 (FIG. 3) are stored in the form of an executable program. The system has a PC-104 bus 20 communicating with the different cards and an electric power supply card 27 having as input a standard 28-volt airplane power supply and generating and distributing the +5V,±12V needed by the cards through buses.

In this embodiment the directions of local gravity $\vec{g}$ and of the projection of the Earth's magnetic field on the horizontal plane perpendicular to local gravity $\vec{e}$, considered constants, are used as noncollinear constant unit vectors. Both in body axes and in the Earth's axes, the components of these vectors are calculated from previously mentioned sensor measurements in the sensor data acquisition and processing module 17.

So to calculate $\hat{g}_b$, the specific force $\hat{a}_b(t)$ measured by the accelerometers 212 is acquired in module 17 and delayed a time τ, corresponding to five sampling periods in the FIFO 170 to obtain $\hat{a}_b(t-\tau)$ and supply it to module 178. Similarly, the angular velocity $\hat{\omega}_b(t)$ measured by the gyroscopes 211 is acquired in the angular velocity acquisition and processing module 11 and is delayed in the FIFO 111 to obtain $\hat{\omega}_b(t-\tau)$ which is supplied to module 178. The static pressure $\hat{p}_s$ measured in sensor 231 and the differential pressure $\hat{p}_d$ measured in sensor 232 are acquired in module 17 and processed in the altitude and speed calculation module 171 to obtain $\hat{v}$ the true airspeed (TAS) and the altitude h by a process that is known for a person skilled in the art. As this process requires knowing the outside ambient temperature $T_0$, such temperature is initially provided before the flight, for example in an initialization file. The true airspeed $\hat{v}$ is supplied to module 176 together with the angle of attack $\hat{\alpha}$ acquired from sensor 241, and the angle of sideslip $\hat{\beta}$ acquired from sensor 242, and the air velocity vector in body axes $\hat{v}_b(t)$ is calculated in said module 176 as follows:

$$\hat{v}_b = \begin{bmatrix} \hat{v}\cos\hat{\alpha}\cos\hat{\beta} \\ \hat{v}\sin\hat{\beta} \\ \hat{v}\sin\hat{\alpha}\cos\hat{\beta} \end{bmatrix}$$

This velocity is delayed a time τ to obtain $\hat{v}_b(t-\tau)$ which is supplied to module 178. The velocity $\hat{v}_b(t)$ is numerically derived by using a Savitzky-Golay filter 179 [ref. 6] of degree four with a window of 11 samples, the derivative for the sample being calculated with index 5, i.e. the derivative is delayed τ, five sampling periods. This derivative $\dot{\hat{v}}_b(t-\tau)$ is supplied to module 178 where the components of the local gravity vector $\hat{g}_b(t-\tau)$ in body axes are finally calculated as follows:

$$\hat{g}_b(t-\tau) = \dot{\hat{v}}_b(t-\tau) + \hat{\omega}_b(t-\tau) \times \hat{v}_b(t-\tau) - \hat{a}_b(t-\tau)$$

which correspond to the translational equations of the movement of the vehicle with the hypothesis of "flat Earth", constant gravity, accelerometer located in the vehicle's center of gravity and constant wind speed. In view of these equations, the reason for delaying the different variables is justified. Obtaining the numerical derivative of velocity, which is a variable that contains noise, is not an easy task; one of the best solutions is the Savitzky-Golay filter, but it is a non-causal filter so the moment in which the derivative is calculated must be delayed.

To calculate $\hat{e}_b$, the value of the Earth's magnetic field $\hat{m}_b(t)$ measured in the magnetometer 22 is first acquired in module 17 and is delayed a time τ in the FIFO 174 to obtain $\hat{m}_b(t-\tau)$ and supply it to module 175. The following calculation is performed in this module 175, which has also been provided with $\hat{g}_b(t-\tau)$:

$$\hat{e}_b(t-\tau) = \hat{m}_b(t-\tau) - \hat{m}_b(t-\tau) \cdot \frac{\hat{g}_b(t-\tau)}{|\hat{g}_b(t-\tau)|}$$

The calculation of the components of the unit vectors in Earth's axes in the direction of local gravity and the projection of the Earth's magnetic field on the horizontal plane perpendicular to local gravity $\vec{g}_t, \vec{e}_t$ is done in module 173. An International Geomagnetic Reference Field (IGRF) [ref. 4] model is implemented in this module 173 which provides the components of the Earth's magnetic field in Earth's axes $\vec{m}_t$ given the position of the vehicle $\hat{P}_t$. A local gravity model provides $\vec{g}_t$ in the same manner from the position of the vehicle $\hat{P}_t$. To obtain this position, the measurements of the GPS 25 are obtained in module 17, processed in module 172 to convert them from the GPS reference system to Earth's axes and the position $\hat{P}_t$ thus obtained is supplied to module 173.

The three gyroscopes 211 located along the aircraft body axes measure the three components of the angular velocity $\hat{\omega}_b$ in these axes. It is acquired in an angular velocity acquisition and processing module 11, where a FIFO 111 is delayed a time τ corresponding to five sampling periods. Module 11 supplies the current angular velocity $\hat{\omega}_b(t)$ to the kinematic equation solution module 13 and the delayed angular velocity $\hat{\omega}_b(t-\tau)$ to module 12, where the correction $u_\omega(t-\tau)$ calculated in control module 14 is added to it to obtain a corrected angular velocity $\hat{\omega}_b(t-\tau) = \hat{\omega}_b(t-\tau) + u_\omega(t-\tau)$, which is also supplied to module 13.

The quaternion $q^T = [q_0 q_1 q_2 q_3]$ is used in the kinematic equation solution module 13 as an attitude representation means. The quaternion is initially calculated in module 134 from the initial Euler angles $\phi_0^T = [\phi\theta\psi]$ supplied externally as shown below:

$$q_0(t_0) = \cos\left(\frac{\phi_0}{2}\right)\cos\left(\frac{\theta_0}{2}\right)\cos\left(\frac{\psi_0}{2}\right) + \sin\left(\frac{\phi_0}{2}\right)\sin\left(\frac{\theta_0}{2}\right)\sin\left(\frac{\psi_0}{2}\right) \quad [2.1]$$

$$q_1(t_0) = \sin\left(\frac{\phi_0}{2}\right)\cos\left(\frac{\theta_0}{2}\right)\cos\left(\frac{\psi_0}{2}\right) - \cos\left(\frac{\phi_0}{2}\right)\sin\left(\frac{\theta_0}{2}\right)\sin\left(\frac{\psi_0}{2}\right)$$

$$q_2(t_0) = \cos\left(\frac{\phi_0}{2}\right)\sin\left(\frac{\theta_0}{2}\right)\cos\left(\frac{\psi_0}{2}\right) + \sin\left(\frac{\phi_0}{2}\right)\cos\left(\frac{\theta_0}{2}\right)\sin\left(\frac{\psi_0}{2}\right)$$

$$q_3(t_0) = \cos\left(\frac{\phi_0}{2}\right)\cos\left(\frac{\theta_0}{2}\right)\sin\left(\frac{\psi_0}{2}\right) - \sin\left(\frac{\phi_0}{2}\right)\sin\left(\frac{\theta_0}{2}\right)\cos\left(\frac{\psi_0}{2}\right)$$

The kinematic equations of the movement of the vehicle expressed according to the quaternion are:

$$\begin{bmatrix} \dot{q}_0 \\ \dot{q}_1 \\ \dot{q}_2 \\ \dot{q}_3 \end{bmatrix} = \frac{1}{2}\begin{bmatrix} 0 & \omega_0 & \omega_1 & \omega_2 \\ -\omega_0 & 0 & -\omega_2 & \omega_1 \\ -\omega_1 & \omega_2 & 0 & -\omega_0 \\ -\omega_2 & -\omega_1 & \omega_0 & 0 \end{bmatrix}\begin{bmatrix} q_0 \\ q_1 \\ q_2 \\ q_3 \end{bmatrix} \quad [2.2]$$

which shall be represented in abbreviated form as: $\dot{q}(t) = \psi(\omega_b(t))q(t)$. These equations will be integrated in two steps:

$$q(t) = \int_{t_0}^{t-\tau}\dot{q}(\xi)d\xi + \int_{t-\tau}^{t}\dot{q}(\xi)d\xi,$$

in a first step, the corrected angular velocity $\hat{\omega}$ will be used in the differential equations [2.2] and will be integrated in module 137 using, for example, the McKern method [ref. 5], from the initial time until t−τ because only $\hat{\omega}_b(t-\tau)$, not $\hat{\omega}_b(t)$, is available in each instant t. $\hat{q}(t-\tau)$ is thus obtained and as was demonstrated when developing the control law, it is known that the error $\tilde{q}(t-\tau) = q(t-\tau)$ is bounded. The second step of the integration is done in module 132 where the derivative of the quaternion, calculated in module 131 using the angular velocity $\hat{\omega}_b(t)$, is integrated from instant t−τ until t, and using as an initial value in t−τ the quaternion estimated in module 137: $\hat{q}(t-\tau)$. Given that this second step of the integration is carried out during a very short time τ, corresponding to five samples, the error committed by using $\hat{\omega}_b(t)$ rather than $\omega_b(t)$ is negligible and the obtained result is $\hat{q}(t)$, which is distributed to module 138 where the transformation matrix $\hat{B}(t)$ for transforming the Earth's axes into body axes is calculated as shown below:

$$\hat{B} = \begin{bmatrix} \hat{q}_0^2 + \hat{q}_1^2 - \hat{q}_2^2 - \hat{q}_3^2 & 2(\hat{q}_1\hat{q}_2 - \hat{q}_0\hat{q}_3) & 2(\hat{q}_1\hat{q}_3 + \hat{q}_0\hat{q}_2) \\ 2(\hat{q}_1\hat{q}_2 + \hat{q}_0\hat{q}_3) & \hat{q}_0^2 - \hat{q}_1^2 + \hat{q}_2^2 - \hat{q}_3^2 & 2(\hat{q}_2\hat{q}_3 - \hat{q}_0\hat{q}_1) \\ 2(\hat{q}_1\hat{q}_3 - \hat{q}_0\hat{q}_2) & 2(\hat{q}_2\hat{q}_3 - \hat{q}_0\hat{q}_1) & \hat{q}_0^2 - \hat{q}_1^2 - \hat{q}_2^2 + \hat{q}_3^2 \end{bmatrix}$$

using the quaternion $\hat{q}(t)$. $\hat{B}(t-\tau)$ is calculated in the same way in module 138 using $\hat{q}(t-\tau)$ provided by module 137.

Once $\hat{B}(t-\tau)$ provided by module 137 and $\vec{e}_t(t-\tau), \vec{g}_t(t-\tau)$ provided by 17 are known, $\hat{e}_b(t-\tau), \hat{g}_b(t-\tau)$ is synthesized in module 15 as shown below:

$$\hat{e}_b(t-\tau) = \hat{B}(t-\tau)\vec{e}_t$$

$$\hat{g}_b(t-\tau) = \hat{B}(t-\tau)\vec{g}_t$$

and the previous correction $u_\omega(t-\tau)$ is calculated in module 14 by means of the control law:

$$u_\omega(t-\tau) = \sigma(\hat{g}_b(t-\tau) \times \hat{g}_b(t-\tau) + \hat{e}_b(t-\tau) \times \hat{e}_b(t-\tau))$$

where σ is a positive constant scalar gain which has been selected in this case at a value of 0.1.

Figure 6:
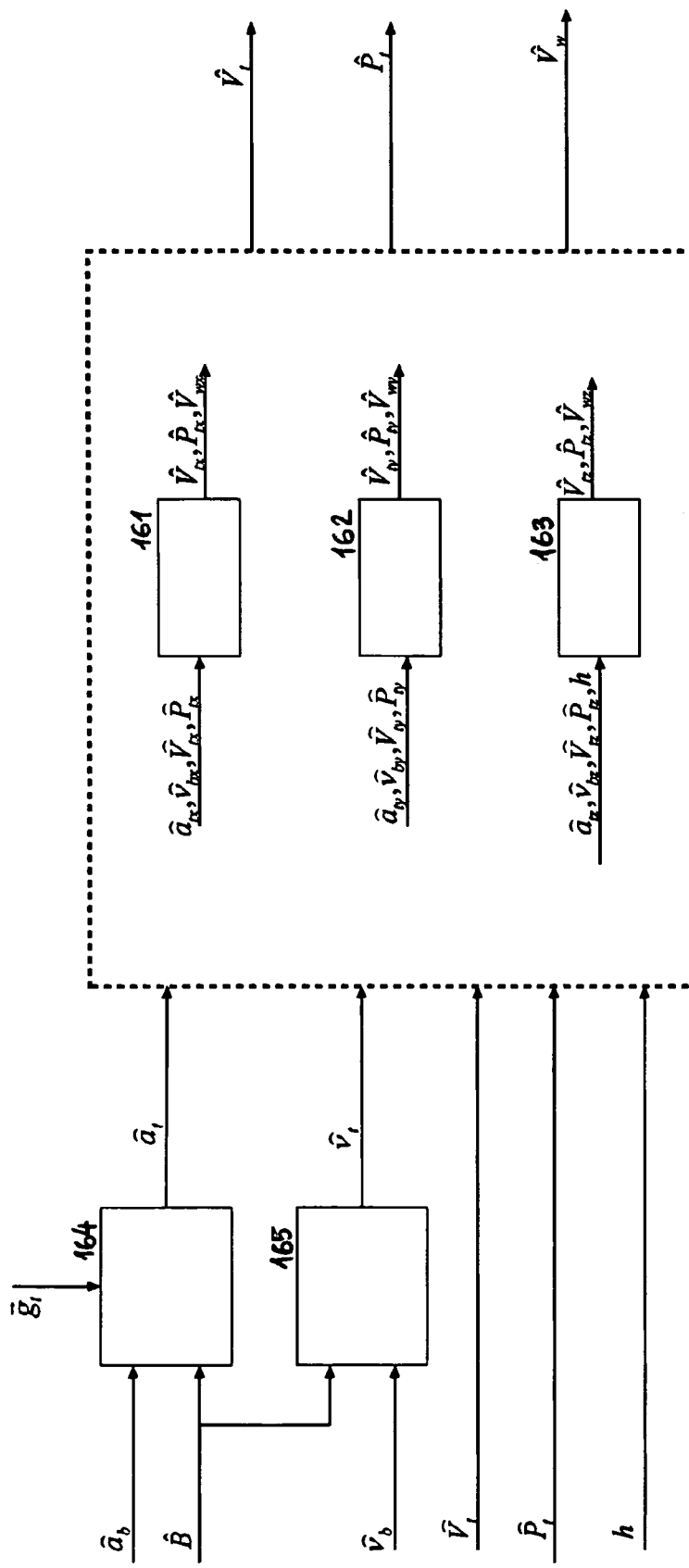
FIG. 6 shows a detailed block diagram of the navigation module.

As is shown in FIG. 6, the navigation module 16 consists of three stationary Kalman filters, one for each channel x, y, z, 161, 162, 163 respectively, and the acceleration in the Earth's axes is calculated in module 164 from the specific force $\hat{a}_b(t)$ and gravity $\vec{g}_t$ provided by module 17 and B(t) provided by module 13:

$$\hat{a}_t = \hat{B}^T\hat{a}_b + g_t$$

and each component of $\hat{a}_t$ is supplied as a control signal to each of the filters. Assume that $\hat{a}_t$ contains exponentially correlated noise that can be described as:

$$a_t = \hat{a}_t + r$$

$$\dot{r} = -\gamma r + \epsilon_r$$

where $\epsilon_r$ is white noise with zero mean and γ is diagonal. Therefore, the basic state vector consisting of $p_t, V_t$ position and velocity increases with r, corresponding to the previous shaping filter to take into account the correlation in acceleration.

It is considered that the velocity of the mass of air with respect to the Earth consists of one constant $V_w$, the wind velocity, and a correlated noise $w_g$ representing atmospheric turbulence and which can be represented by:

$$\begin{bmatrix} \dot{s}_0 \\ \dot{s}_1 \end{bmatrix} = \begin{bmatrix} 0 & 1 \\ \lambda_0 & \lambda_1 \end{bmatrix} \begin{bmatrix} s_0 \\ s_1 \end{bmatrix} + \begin{bmatrix} 0 \\ 1 \end{bmatrix} \epsilon_s$$

$$w_g = \begin{bmatrix} \mu_0 & \mu_1 \end{bmatrix} \begin{bmatrix} s_0 \\ s_1 \end{bmatrix}$$

where $\epsilon_s$ is white noise with zero mean and the constants $\lambda,\mu$ are determined from the spectral density specified in [Mil. Spec. 1797].

To identify the wind velocity in the Earth's axes, the previously mentioned shaping filter will be incorporated adding three more components to the state vector of each of the filters: $V_w, s_0, s_1$. Finally the state vector is:

The state equations are:

$\dot{p}_t = V_t$ $\dot{V}_t = \hat{a}_t + r$ $\dot{r} = -\gamma r + \epsilon_r$ $\dot{s}_0 = s_1$ $\dot{s}_1 = \lambda_0 s_0 - \lambda_1 s_1 + \epsilon_3$ $\dot{V}_w = 0$ In addition to the GPS measurements $\hat{p}_t, \hat{V}_t$, the air velocity in the Earth's axes will be incorporated:

$\hat{v}_t = \hat{B}^T \hat{v}_b$ which is calculated in module 165.

The measurement of the barometric height will also be incorporated but only in the filter corresponding to channel z:

$h - h_0 = -p_{t2} + \eta_h$

The measurement equations are:

$\hat{v}_t = V_t - V_w - \mu_0 s_0 - \mu_1 s_1 + \eta_v$ $\hat{V}_t = V_t + \eta_V$ $\hat{p}_t = p_t + \eta_p$ $h - h_0 = -p_{t2} + \eta_h$ where $\eta$ is white noise with zero mean.

The Kalman filters are:

$\dot{x}_i = A_i x_i + B_i \hat{a}_{ti} + K_i [y_i - C_i x_i]$ $i = 0,1,2$ where:

$$A_i = \begin{bmatrix} 0 & 1 & 0 & 0 & 0 & 0 \\ 0 & 0 & 1 & 0 & 0 & 0 \\ 0 & 0 & -\gamma_i & 0 & 0 & 0 \\ 0 & 0 & 0 & 0 & 1 & 0 \\ 0 & 0 & 0 & \lambda_{0i} & \lambda_{1i} & 0 \\ 0 & 0 & 0 & 0 & 0 & 0 \end{bmatrix} \quad B_i = \begin{bmatrix} 0 \\ 1 \\ 0 \\ 0 \\ 0 \\ 0 \end{bmatrix}$$

$i = 0, 1, 2$ $$y_i = \begin{bmatrix} \hat{v}_{ti} \\ \hat{V}_{ti} \\ \hat{p}_{ti} \end{bmatrix} \quad i = 0, 1; \quad y_2 = \begin{bmatrix} \hat{v}_{t2} \\ \hat{V}_{t2} \\ \hat{p}_{t2} \\ h - h \end{bmatrix}$$

$$C_i = \begin{bmatrix} 1 & 0 & 0 & 0 & 0 & 0 \\ 0 & 1 & 0 & 0 & 0 & 0 \\ 0 & 1 & 0 & -\mu_{0i} & -\mu_{1i} & -1 \end{bmatrix} \quad i = 0, 1$$

$$C_2 = \begin{bmatrix} 1 & 0 & 0 & 0 & 0 & 0 \\ 0 & 1 & 0 & 0 & 0 & 0 \\ 0 & 1 & 0 & -\mu_{02} & -\mu_{12} & -1 \\ -1 & 0 & 0 & 0 & 0 & 0 \end{bmatrix}$$

and the gains $K_i$ are obtained by solving the corresponding algebraic Riccati equation given the covariance matrixes of the process $Q_i$ and measurement $R_i$ noise:

$A_i P_i + P_i A_i^T + Q_i - P_i C_i^T R_i^{-1} C_i P_i = 0$ $i = 0,1,2$

The invention claimed is:

1. A system for estimating the position, velocity and orientation of a vehicle, comprising:
    an Inertial Measurement Unit (IMU) including a group of at least three gyroscopes for measuring the angular velocity $\hat{\omega}_b(t)$ of the vehicle in body axes and at least three accelerometers located along the vehicle body axes to provide the specific force $\hat{a}_b$ in body axes;
    a magnetometer able to measure the Earth's magnetic field according to the vehicle body axes;
    static pressure and differential pressure sensors;
    two vanes to measure the angles of attack and side slip;
    an angular velocity acquisition and processing module configured to acquire the angular velocity $\hat{\omega}_b(t)$ and delay it to obtain $\hat{\omega}_b(t-\tau)$;
    a data acquisition and processing module configured to acquire the specific force $\hat{a}_b(t)$ measured by the accelerometers, the static pressure $\hat{p}_s(t)$ measured in sensor, the differential pressure $\hat{p}_d(t)$ measured in sensor, the angle of attack $\hat{\alpha}(t)$ measured in sensor, the angle of sideslip $\hat{\beta}(t)$ measured in sensor and the value of the Earth's magnetic field $\hat{m}_b(t)$ measured in the magnetometer, delay them and process them to calculate the true airspeed $\hat{v}(t-\tau)$, the air velocity in body axes $\hat{v}_b(t-\tau)$ as follows:

$$\hat{v}_b = \begin{bmatrix} \hat{v}\cos\hat{\alpha}\cos\hat{\beta} \\ \hat{v}\sin\hat{\beta} \\ \hat{v}\sin\hat{\alpha}\cos\hat{\beta} \end{bmatrix},$$

the numerical derivative of the air velocity in body axes $\hat{v}(t-\tau)$, the local gravity in body axes $\hat{g}_b$ as follows:

$\hat{g}_b(t-\tau) = \dot{\hat{v}}_b(t-\tau) + \hat{\omega}_b(t-\tau) \times \hat{v}_b(t-\tau) - \hat{a}_b(t-\tau)$ and the projection of the Earth's magnetic field on the horizontal plane perpendicular to local gravity $\vec{e}(t-\tau)$ as follows:

$$\hat{e}_b(t-\tau) = \hat{m}_b(t-\tau) - \hat{m}_b(t-\tau) \cdot \frac{\hat{g}_b(t-\tau)}{|\hat{g}_b(t-\tau)|};$$

- a GPS receiver for determining the components of said two noncollinear constant unit vectors $\vec{g}_t, \vec{e}_t$ according to the Earth's axes; wherein the data provided by the GPS are acquired, processed and used in the data acquisition and processing module to calculate said components $\vec{g}_t, \vec{e}_t$;
- a module for correcting said angular velocity $\hat{\omega}_b$ with a correction $u_\omega$ and obtaining a corrected angular velocity $\hat{\omega}_b = \hat{\omega}_b + u_\omega$;
- a module for integrating the kinematic equations of the vehicle receiving the corrected angular velocity $\hat{\omega}_b$ as input and providing the transformation matrix $\hat{B}$ for transforming Earth's axes into vehicle body axes and the orientation of the vehicle in the form of Euler angles $\hat{\phi}$;
- a synthesis module of the components in body axes of the two noncollinear constant unit vectors to provide an estimation of said noncollinear vectors in body axes $\hat{g}_b, \hat{e}_b$, where said estimation is calculated as follows:

$$\vec{g}_b = B \vec{g}_t$$

$$\vec{e}_b = B \vec{e}_t$$

- a control module implementing a control law to calculate said correction $u_\omega$, where said control law is:

$$u_\omega = \sigma(\hat{g}_b \times \hat{g}_b + \hat{e}_b \times e\hat{e}_b) \quad [1]$$

where $\sigma$ is a positive scalar,
such that by applying this correction $u_\omega$ to the measured angular velocity $\hat{\omega}_b$ and using the resulting angular velocity $\hat{\omega}_b = \hat{\omega}_b + u_\omega$ as input to the module for integrating the kinematic equations, the latter are stable in the ISS sense and the error in the estimation of the direction cosine matrix $\hat{B}$ and of the Euler angles $\hat{\phi}$ is bounded.

2. The system according to claim 1, wherein said noncollinear unit vectors $\vec{g}, \vec{e}$ are local gravity $\vec{g}$ and projection of the magnetic field on the plane perpendicular to gravity $\vec{e}$.

3. The system according to claim 1, further comprising a Savitzky-Golay filter where $\hat{\dot{v}}_b$, numerical derivative of $\hat{v}_b$, is calculated.

4. The system according to claim 1, further comprising:
- a navigation module where the navigation equations of the vehicle are integrated from the specific force $\hat{a}_b$ and the direction cosine matrix $\hat{B}$ to obtain calculated position and velocity in local axes and corrected in a Kalman filter to obtain estimated position and velocity in local axes.

5. A method for estimating the position, velocity and orientation of a vehicle comprising:
- calculating the components of two noncollinear constant unit vectors $\hat{g}_b, \hat{e}_b$ according to vehicle body axes from measurements of sensors located in the vehicle according to the body axes of the latter, said calculation comprising:
  - measuring specific force $\hat{a}_b(t)$ in body axes, static pressure $\hat{a}_s(t)$, differential pressure $\hat{p}_d(t)$, angle of attack $\hat{\alpha}(t)$, angle of sideslip $\hat{\beta}(t)$ and the value of the Earth's magnetic field $\hat{m}_b(t)$;
  - calculating the true airspeed $\hat{v}(t)$ from the differential pressure $\hat{p}_d(t)$ and static pressure $\hat{p}_s(t)$ measurements and from knowing the outside temperature at the initial moment $T_0$;
  - calculating the air velocity in body axes as follows:

$$\hat{v}_b = \begin{bmatrix} \hat{v}\cos\hat{\alpha}\cos\hat{\beta} \\ \hat{v}\sin\hat{\beta} \\ \hat{v}\sin\hat{\alpha}\cos\hat{\beta} \end{bmatrix};$$

- delaying a timer $\tau$ the angular velocity $\hat{\omega}_b(t)$, specific force $\hat{a}_b(t)$, magnetic field $\hat{m}_b(t)$ and air velocity in body axes $\hat{v}_b(t)$;
- calculating the numerical derivative of the air velocity in body axes $\hat{\dot{v}}_b(t-\tau)$;
- calculating the local gravity in body axes $\hat{g}_b$ as follows:

$$\hat{g}_b(t-\tau) = \hat{\dot{v}}_b(t-\tau) + \hat{\omega}_b(t-\tau) \times \hat{v}_b(t-\tau) - \hat{a}_b(t-\tau); y,$$

- calculating the projection of the Earth's magnetic field on the horizontal plane perpendicular to local gravity as follows:

$$\hat{e}_b(t-\tau) = \hat{m}_b(t-\tau) - \hat{m}_b(t-\tau) \cdot \frac{\hat{g}_b(t-\tau)}{|\hat{g}_b(t-\tau)|};$$

- calculating the components of said noncollinear constant unit vectors $\vec{g}_t, \vec{e}_t$, according to the Earth's axes from measurements of sensors located in the vehicle which provide position in Earth-fixed axes;
- measuring the three components of angular velocity $\hat{\omega}_b$ of the vehicle in body axes;
- correcting the angular velocity $\hat{\omega}_b$ with a correction $u_\omega$ and obtaining a corrected angular velocity $\hat{\omega}_b = \hat{\omega}_b + u_\omega$;
- integrating the kinematic equations of the vehicle, according to the corrected angular velocity $\hat{\omega}_b$ and providing the transformation matrix $\hat{B}$ for transforming the Earth's axes into vehicle body axes and the orientation of the vehicle in the form of Euler angles $\hat{\Phi}$;
- calculating an estimation of the components in body axes of the two noncollinear constant unit vectors $\hat{g}_b, \hat{e}_b$, where said estimation is calculated as follows:

$$\hat{g}_b = \hat{B}\vec{g}_t$$

$$\hat{g}_b = \hat{B}\vec{e}_t$$

obtaining the correction $u_\omega$ by means of the control law:

$$u_\omega = \sigma(\hat{g}_b \times \hat{g}_b + \hat{e}_b \times \hat{e}_b) \quad [1]$$

where $\sigma$ is a positive scalar,
such that upon applying this correction $u_\omega$ to the measured angular velocity $\hat{\omega}_b$ and using the resulting angular velocity $\hat{\omega}_b = \hat{\omega}_b + u_\omega$ as input to the module for integrating the kinematic equations, the latter are stable in the ISS sense and the error in the estimation of the direction cosine matrix $\hat{B}$ and of the Euler angles $\hat{\Phi}$ is bounded.

6. The method according to claim 5, wherein said noncollinear unit vectors $\vec{g}, \vec{e}$ are local gravity $\vec{g}$ and projection of the magnetic field on the plane perpendicular to gravity $\vec{e}$.

7. The method according to claim 5, wherein $\dot{\hat{v}}_b$, the numerical derivative of $\hat{v}_b$, is calculated in a Savitzky-Golay filter.

8. A method according to claim 5 including:
   integrating the navigation equations of the vehicle according to the specific force $\hat{a}_b$ and the direction cosine matrix $\hat{B}$ to obtain the calculated position and velocity in local axes and they are corrected in a Kalman filter to obtain estimated position and velocity in local axes.

* * * * *